(12) United States Patent
Mansour et al.

(10) Patent No.: US 9,419,674 B2
(45) Date of Patent: Aug. 16, 2016

(54) SHARED FILTER FOR TRANSMIT AND RECEIVE PATHS

(71) Applicant: QUALCOMM Incorporated, San Diego, CA (US)

(72) Inventors: Rimon E Mansour, Nazareth (IL); Haim M Weissman, Haifa (IL)

(73) Assignee: QUALCOMM Incorporated, San Diego, CA (US)

( * ) Notice: Subject to any disclaimer, the term of this patent is extended or adjusted under 35 U.S.C. 154(b) by 164 days.

(21) Appl. No.: 13/777,721

(22) Filed: Feb. 26, 2013

(65) Prior Publication Data

US 2014/0242923 A1    Aug. 28, 2014

(51) Int. Cl.
*H04B 1/44* (2006.01)
*H04B 1/52* (2015.01)

(52) U.S. Cl.
CPC ... *H04B 1/44* (2013.01); *H04B 1/52* (2013.01)

(58) Field of Classification Search
None
See application file for complete search history.

(56) References Cited

U.S. PATENT DOCUMENTS

| 5,625,894 | A * | 4/1997 | Jou ................................. 455/78 |
| 5,815,048 | A * | 9/1998 | Ala-Kojola et al. .......... 333/101 |
| 6,466,613 | B1 | 10/2002 | Raphaeli et al. |
| 8,188,809 | B2 | 5/2012 | Leinonen et al. |
| 8,269,668 | B2 | 9/2012 | Barker et al. |
| 8,340,235 | B2 | 12/2012 | Maddah-Ali et al. |
| 2005/0046928 | A1 | 3/2005 | Jeon et al. |
| 2005/0207481 | A1 | 9/2005 | Forstner |
| 2007/0040605 | A1 * | 2/2007 | Fan ...................... H03H 7/0153 327/554 |
| 2007/0139138 | A1 * | 6/2007 | Chen ............................. 333/175 |
| 2008/0002597 | A1 | 1/2008 | Fan et al. |
| 2008/0272854 | A1 * | 11/2008 | Hikita et al. .................. 333/133 |
| 2009/0058725 | A1 | 3/2009 | Barker et al. |
| 2010/0321130 | A1 * | 12/2010 | Kim et al. ..................... 333/126 |
| 2011/0234335 | A1 | 9/2011 | Khlat |
| 2014/0002187 | A1 * | 1/2014 | McPartlin et al. ............ 330/250 |

OTHER PUBLICATIONS

Frenzel, Back to Basics-Impedance Matching (Part 2), 2012 http://electronicdesign.com/communications/back-basics-impedance-matching-part-2.*
Fujitsu, Ultra-small SAW duplexer, 2008 http://www.fujitsu.com/downloads/EDG/binary/pdf/find/26-3e/8.pdf.*
International Search Report and Written Opinion—PCT/US2014/016716—ISA/EPO—May 9, 2014, 7 pages.

* cited by examiner

*Primary Examiner* — Ping Hsieh
*Assistant Examiner* — James Yang
(74) *Attorney, Agent, or Firm* — Linda G. Gunderson

(57) ABSTRACT

Shared filters may be used for both transmit and receive paths. In an exemplary design, an apparatus (e.g., a wireless device, an integrated circuit, or a circuit module) may include a filter and a switch. The filter operates as a transmit (TX) filter for a first band and as a receive (RX) filter for a second band. The filter may receive and filter an output radio frequency (RF) signal when operating as the TX filter and may receive and filter a received RF signal when operating as the RX filter. The switch is coupled to the filter and receives and passes the output RF signal to the filter or an input RF signal from the filter. The apparatus may further include a second filter operable as a TX filter for multiple bands and/or a third filter operable as an RX filter for multiple bands.

20 Claims, 8 Drawing Sheets

SHARED FILTER FOR TRANSMIT AND RECEIVE PATHS

BACKGROUND

I. Field

The present disclosure relates generally to electronics, and more specifically to filters for wireless devices.

II. Background

A wireless device (e.g., a cellular phone or a smartphone) in a wireless communication system may transmit and receive data for two-way communication. The wireless device may include a transmitter for data transmission and a receiver for data reception. For data transmission, the transmitter may modulate a local oscillator (LO) signal with data to obtain a modulated signal, amplify the modulated signal to obtain an output radio frequency (RF) signal having the proper output power level, and transmit the output RF signal via an antenna to a base station. For data reception, the receiver may obtain a received RF signal via the antenna and may amplify and process the received RF signal to recover data sent by the base station.

A wireless device may support operation on multiple frequency bands (or simply, "bands"). The wireless device may include a number of filters for transmit paths and receive paths for the multiple bands. For example, the wireless device may include a transmit (TX) filter for a transmit path and a receive (RX) filter for a receive path for each band supported by the wireless device. The wireless device may thus include many filters for all bands supported by the wireless device.

DETAILED DESCRIPTION

The detailed description set forth below is intended as a description of exemplary designs of the present disclosure and is not intended to represent the only designs in which the present disclosure can be practiced. The term "exemplary" is used herein to mean "serving as an example, instance, or illustration." Any design described herein as "exemplary" is not necessarily to be construed as preferred or advantageous over other designs. The detailed description includes specific details for the purpose of providing a thorough understanding of the exemplary designs of the present disclosure. It will be apparent to those skilled in the art that the exemplary designs described herein may be practiced without these specific details. In some instances, well-known structures and devices are shown in block diagram form in order to avoid obscuring the novelty of the exemplary designs presented herein.

Shared filters used for both transmit and receive paths are disclosed herein. The shared filters may greatly reduce the number of filters needed to support multiple frequency bands, carrier aggregation, etc. This may reduce complexity and cost of a wireless device and may provide other advantages. The shared filters may be used for various electronic devices such as wireless communication devices.

Figure 1:
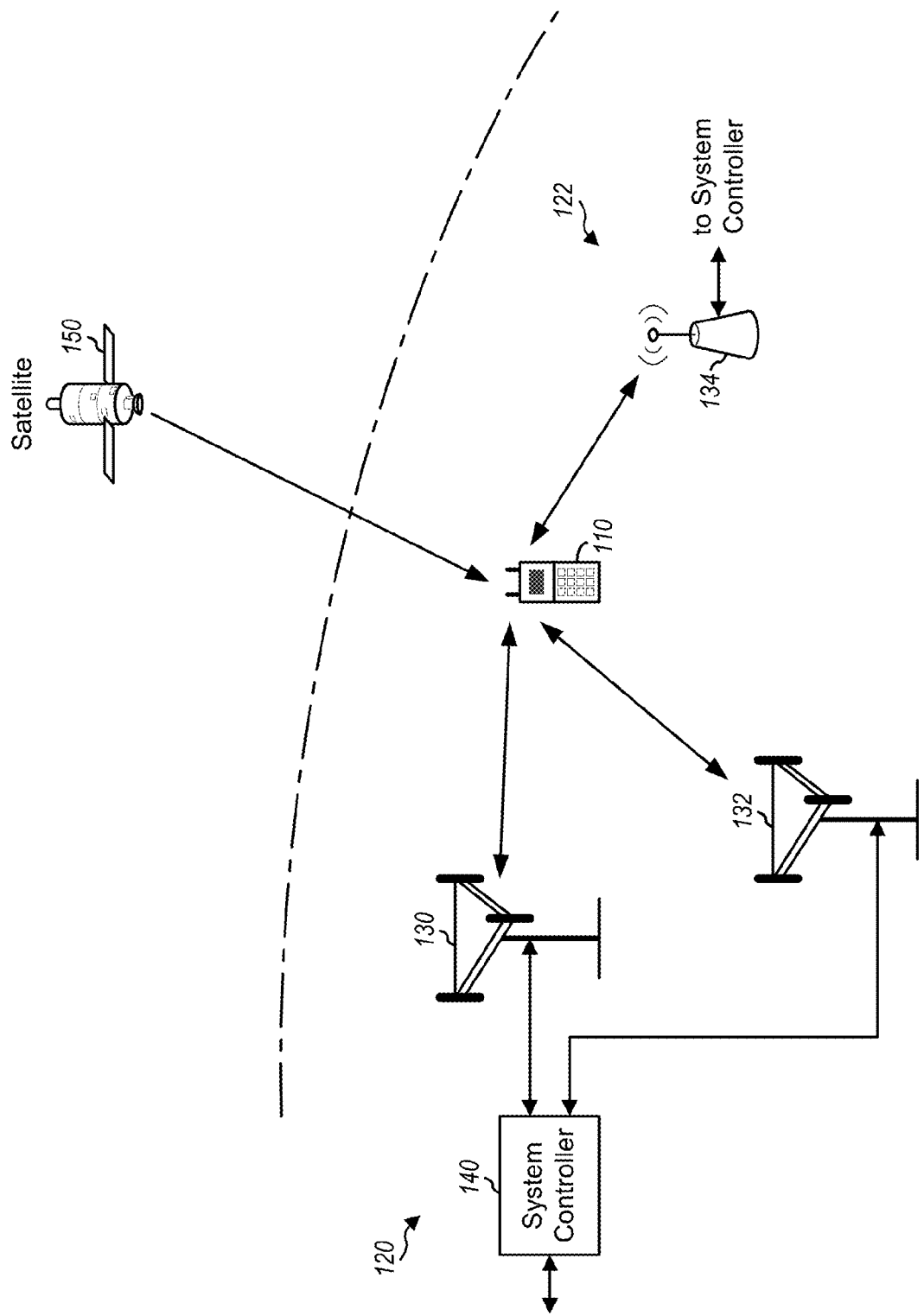
FIG. 1 shows a wireless device communicating with multiple wireless systems.

FIG. 1 shows a wireless device 110 communicating with wireless communication systems 120 and 122. Each wireless system may be a Long Term Evolution (LTE) system, a Code Division Multiple Access (CDMA) system, a Global System for Mobile Communications (GSM) system, a wireless local area network (WLAN) system, or some other wireless system. A CDMA system may implement Wideband CDMA (WCDMA), CDMA 1×, Evolution-Data Optimized (EVDO), Time Division Synchronous CDMA (TD-SCDMA), or some other version of CDMA. For simplicity, FIG. 1 shows wireless system 120 including two base stations 130 and 132 and one system controller 140, and wireless system 122 including one base station 134. In general, a wireless system may include any number of base stations and any set of network entities. A base station may also be referred to as a Node B, an evolved Node B (eNB), an access point, etc.

Wireless device 110 may also be referred to as a user equipment (UE), a mobile station, a terminal, an access terminal, a subscriber unit, a station, etc. Wireless device 110 may be a cellular phone, a smartphone, a tablet, a wireless modem, a personal digital assistant (PDA), a handheld device, a laptop computer, a smartbook, a netbook, a cordless phone, a wireless local loop (WLL) station, a Bluetooth device, etc. Wireless device 110 may communicate with wireless system 120 and/or 122. Wireless device 110 may also receive signals from broadcast stations, signals from satellites (e.g., a satellite 150) in one or more global navigation satellite systems (GNSS), etc. Wireless device 110 may support one or more radio technologies for wireless communication such as LTE, WCDMA, CDMA 1×, EVDO, TD-SCDMA, GSM, 802.11, etc.

Wireless device 110 may be able to operate in low-band (LB) covering frequencies lower than 1000 megahertz (MHz), mid-band (MB) covering frequencies from 1000 MHz to 2300 MHz, and/or high-band (HB) covering frequencies higher than 2300 MHz. For example, low-band may cover 698 to 980 MHz, mid-band may cover 1475 to 2170 MHz, and high-band may cover 2300 to 2690 MHz and 3400 to 3800 MHz. Low-band, mid-band, and high-band refer to three groups of bands (or band groups), with each band group including a number of frequency bands (or simply, "bands"). Each band may cover up to 200 MHz. LTE Release 11 supports 35 bands, which are referred to as LTE/UMTS bands and are listed in a publicly available document 3GPP TS 36.101. In general, any number of band groups may be defined. Each band group may cover any range of frequencies, which may or may not match any of the frequency ranges given above. Each band group may include any number of bands.

A band includes (i) a receive (RX) frequency range for transmission from base stations to wireless devices and (ii) a transmit (TX) frequency range for transmission from wireless devices to base stations, where the terms "transmit" and "receive" are from the perspective of a wireless device. The TX frequency range is different from the RX frequency range for frequency division duplexing (FDD) and is the same as the RX frequency range for time division duplexing (TDD). Different bands include different TX frequency ranges and different RX frequency ranges.

Wireless device 110 may support carrier aggregation (CA), which is simultaneous operation on multiple carriers. Carrier aggregation may also be referred to as multi-carrier operation. A carrier may refer to a range of frequencies used for communication and may be associated with certain characteristics. For example, a carrier may be associated with system information and/or control information describing operation on the carrier. A carrier may also be referred to as a component carrier (CC), a frequency channel, a cell, etc. A band may include one or more carriers. Each carrier may cover up to 20 MHz in LTE. Wireless device 110 may be configured with up to 5 carriers in one or two bands in LTE Release 11. For example, wireless device 110 may be configured with two carriers on the downlink and one carrier on the uplink for downlink CA. Wireless device 110 may also be configured with two carriers on the downlink and two carriers on the uplink for uplink CA.

In general, carrier aggregation may be categorized into two types—intra-band CA and inter-band CA. Intra-band CA refers to operation on multiple carriers within the same band. Inter-band CA refers to operation on multiple carriers in different bands.

Figure 2:
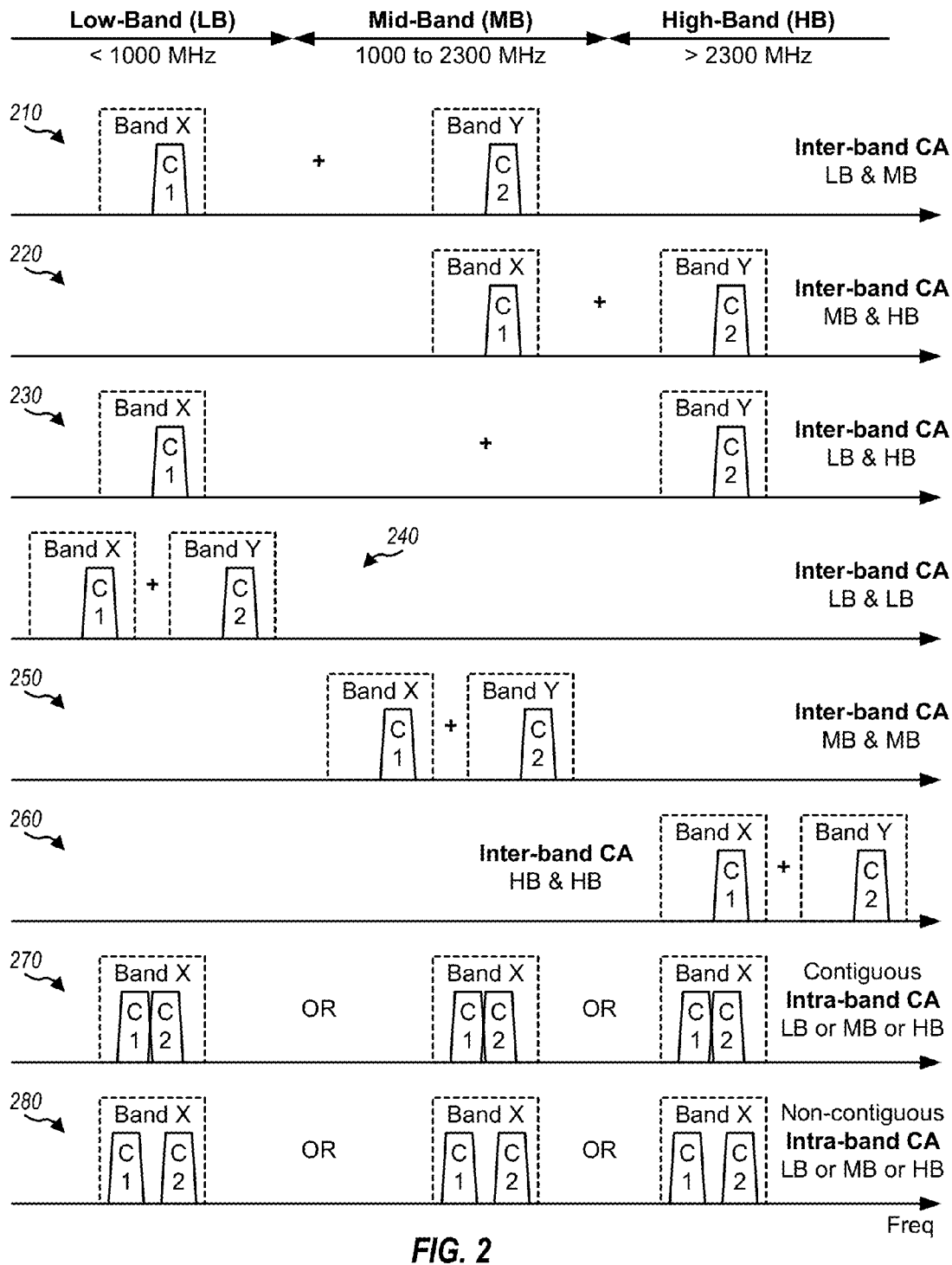
FIG. 2 shows various carrier aggregation scenarios.

FIG. 2 shows various CA scenarios that may be supported by wireless device 110. For simplicity, FIG. 2 shows wireless device 110 being configured with only one carrier in a band for inter-band CA. In general, wireless device 110 may be configured with one or more carriers in a given band.

Scenario 210 covers inter-band CA with one carrier C1 in band X in low-band and one carrier C2 in band Y in mid-band being configured for wireless device 110. Scenario 220 covers inter-band CA with one carrier C1 in band X in mid-band and one carrier C2 in band Y in high-band being configured for wireless device 110. Scenario 230 covers inter-band CA with one carrier C1 in band X in low-band and one carrier C2 in band Y in high-band being configured for wireless device 110.

Scenario 240 covers inter-band CA with one carrier C1 in band X in low-band and one carrier C2 in band Y also in low-band being configured for wireless device 110. Scenario 250 covers inter-band CA with one carrier C1 in band X in mid-band and one carrier C2 in band Y also in mid-band being configured for wireless device 110. Scenario 260 covers inter-band CA with one carrier C1 in band X in high-band and one carrier C2 in band Y also in high-band being configured for wireless device 110.

Scenario 270 covers contiguous intra-band CA with two adjacent carriers C1 and C2 in band X in low-band, or mid-band, or high-band being configured for wireless device 110. Scenario 280 covers non-contiguous intra-band CA with two non-adjacent carriers C1 and C2 in band X in low-band, or mid-band, or high-band being configured for wireless device 110.

FIG. 2 shows some examples of carrier aggregation. Carrier aggregation may also be supported for other combinations of bands and band groups.

Figure 3:
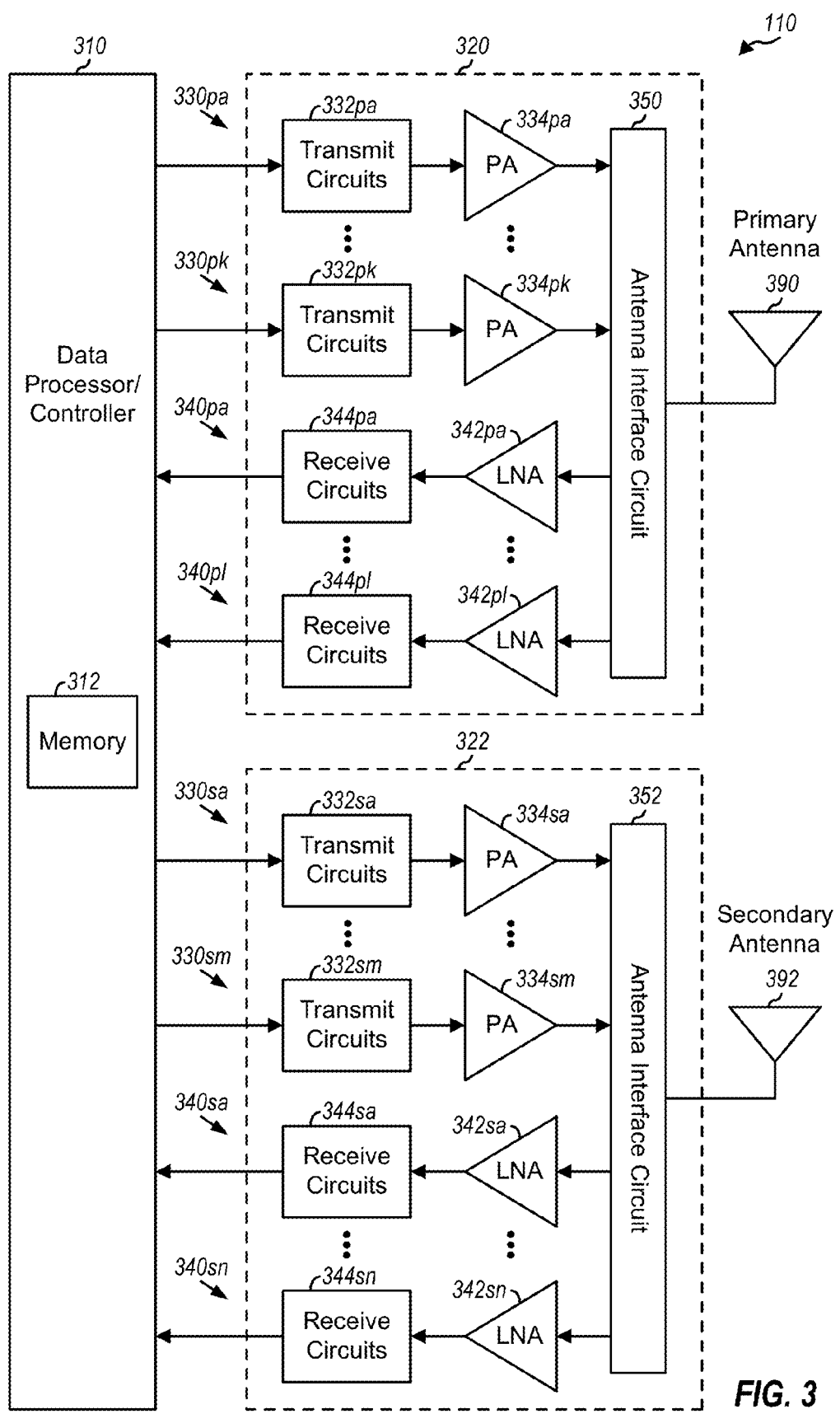
FIG. 3 shows a block diagram of the wireless device in FIG. 1.

FIG. 3 shows a block diagram of an exemplary design of wireless device 110 in FIG. 1. In this exemplary design, wireless device 110 includes a data processor/controller 310, a transceiver 320 coupled to a primary antenna 390, and a transceiver 322 coupled to a secondary antenna 392. Transceiver 320 includes K transmitters 330pa to 330pk, L receivers 340pa to 340pl, and an antenna interface circuit 350 to support multiple bands, carrier aggregation, multiple radio technologies, etc. K and L may each be any integer value of one or greater. Transceiver 322 includes M transmitters 330sa to 330sm, N receivers 340sa to 340sn, and an antenna interface circuit 352 to support multiple bands, carrier aggregation, multiple radio technologies, receive diversity, multiple-input multiple-output (MIMO) transmission from multiple transmit antennas to multiple receive antennas, etc. M and N may each be any integer value of zero or greater.

In the exemplary design shown in FIG. 3, each transmitter 330 includes transmit circuits 332 and a power amplifier (PA) 334. For data transmission, data processor 310 processes (e.g., encodes and modulates) data to be transmitted and provides one or more analog output signals to one or more selected transmitters, e.g., for transmission in one or more bands. The description below assumes that transmitter 330pa is the only selected transmitter. Within transmitter 330pa, transmit circuits 332pa amplify, filter, and upconvert an analog output signal from baseband to RF and provide a modulated signal. Transmit circuits 332pa may include amplifiers, filters, mixers, matching circuits, an oscillator, an LO generator, a phase-locked loop (PLL), etc. A PA 334pa receives and amplifies the modulated signal and provides an output RF signal having the proper output power level. The output RF signal is routed through antenna interface circuit 350 and transmitted via antenna 390. Antenna interface circuit 350 may include one or more filters, duplexers, triplexers, quadplexers, diplexers, switches, matching circuits, directional couplers, etc. Each remaining transmitter 330 in transceivers 320 and 322 may operate in similar manner as transmitter 330pa.

In the exemplary design shown in FIG. 3, each receiver 340 includes a low noise amplifier (LNA) 342 and receive circuits 344. For data reception, antenna 390 receives signals from base stations and/or other transmitter stations and provides a received RF signal. Antenna interface circuit 350 receives and filters the received RF signal and provides one or more input RF signals (e.g., for one or more bands) to one or more selected receivers. The description below assumes that receiver 340pa is the only selected receiver. Within receiver 340pa, LNA 342pa amplifies the input RF signal and provides an amplified RF signal. Receive circuits 344pa downconvert the amplified RF signal from RF to baseband, amplify and filter the downconverted signal, and provide an analog input signal to data processor 310. Receive circuits 344pa may include mixers, filters, amplifiers, matching circuits, an oscillator, an LO generator, a PLL, etc. Each remaining receiver 340 in transceivers 320 and 322 may operate in similar manner as receiver 340pa.

FIG. 3 shows an exemplary design of transmitters 330 and receivers 340. A transmitter and a receiver may also include other circuits not shown in FIG. 3, such as filters, matching circuits, etc. All or a portion of transceivers 320 and 322 may be implemented on one or more analog integrated circuits (ICs), RF ICs (RFICs), mixed-signal ICs, etc. For example, transmit circuits 332, LNAs 342, and receive circuits 344 may be implemented on one module, which may be an RFIC, etc. Antenna interface circuits 350 and 352 and PAs 334 may be implemented on another module, which may be a hybrid module, etc. The circuits in transceivers 320 and 322 may also be implemented in other manners.

Data processor/controller 310 may perform various functions for wireless device 110. For example, data processor 310 may perform processing for data being transmitted via transmitters 330 and data being received via receivers 340. Controller 310 may control the operation of transmit circuits 332, PAs 334, LNAs 342, receive circuits 344, antenna interface circuits 350 and 352, or a combination thereof. A memory 312 may store program codes and data for data processor/controller 310. Data processor/controller 310 may be implemented on one or more application specific integrated circuits (ASICs) and/or other ICs.

Antenna interface circuits 350 and 352 may be implemented in various manners to support multiple bands, carrier aggregation, etc. Some exemplary designs of antenna interface circuits 350 and 352 are described below.

Figure 4:
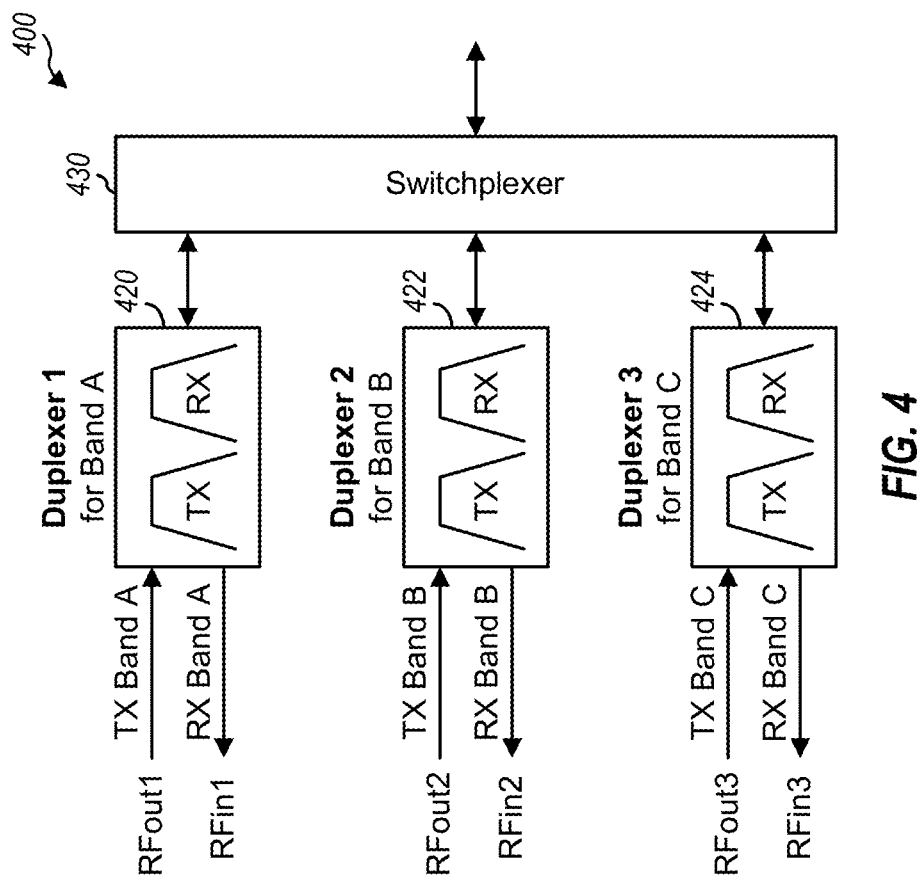
FIG. 4 shows an antenna interface circuit supporting three bands with duplexers.

FIG. 4 shows a block diagram of an antenna interface circuit 400 supporting three bands, which are referred to as Band A, Band B, and Band C. Antenna interface circuit 400 includes three duplexers 420, 422 and 424 for the three Bands A, B and C, respectively, and a single-pole-n-throw (SPnT) switch 430. An SPnT switch may also be referred to as a switchplexer.

Duplexer 420 includes a TX filter and an RX filter for Band A, duplexer 422 includes a TX filter and an RX filter for Band B, and duplexer 424 includes a TX filter and an RX filter for Band C. Duplexer 420 has its TX filter input receiving a first output RF signal (RFout1), its RX filter output providing a first input RF signal (RFin1), and its TX filter output and RX filter input coupled together and further to a first throw of switchplexer 430. Duplexer 422 has its TX filter input receiving a second output RF signal (RFout2), its RX filter output providing a second input RF signal (RFin2), and its TX filter output and RX filter input coupled together and further to a second input of switchplexer 430. Duplexer 424 has its TX filter input receiving a third output RF signal (RFout3), its RX filter output providing a third input RF signal (RFin3), and its TX filter output and RX filter input coupled together and further to a third input of switchplexer 430. Switchplexer 430 has its output coupled directly or indirectly to an antenna (e.g., coupled to the antenna via a circuit such as a directional coupler).

For data transmission on Band A, the RFout1 signal for Band A is filtered by the TX filter in duplexer 420 and routed through switchplexer 430 to the antenna (not shown in FIG. 4). For data reception on Band A, a received RF signal from the antenna is routed through switchplexer 430, filtered by the RX filter in duplexer 420, and provided as the RFin1 signal. Data transmission and reception on Bands B and C occur in similar manner.

As shown in FIG. 4, a separate duplexer is conventionally used for each band supported by a wireless device. A duplexer for a given band X includes (i) a TX filter for a TX frequency range of band X and (ii) an RX filter for an RX frequency range of band X. In the example shown in FIG. 4, three duplexers comprising a total of six filters are used to support three bands.

In an aspect of the present disclosure, a filter may be used as both a TX filter for a first band and an RX filter for a second band. The TX frequency range for the first band may overlap the RX frequency range for the second band. Furthermore, communication may occur on only one band (and not both bands) at any given moment. The filter may thus be shared by the two bands and used as either the TX filter when the first band is selected or the RX filter when the second band is selected. Sharing TX and RX filters for different bands may reduce the total number of filters needed to support a number of bands on a wireless device.

In another aspect of the present disclosure, a filter may be used as a TX filter for multiple bands having overlapping TX frequency ranges. Sharing TX filters for multiple bands may reduce the total number of filters needed to support a number of bands on a wireless device.

Figure 5:
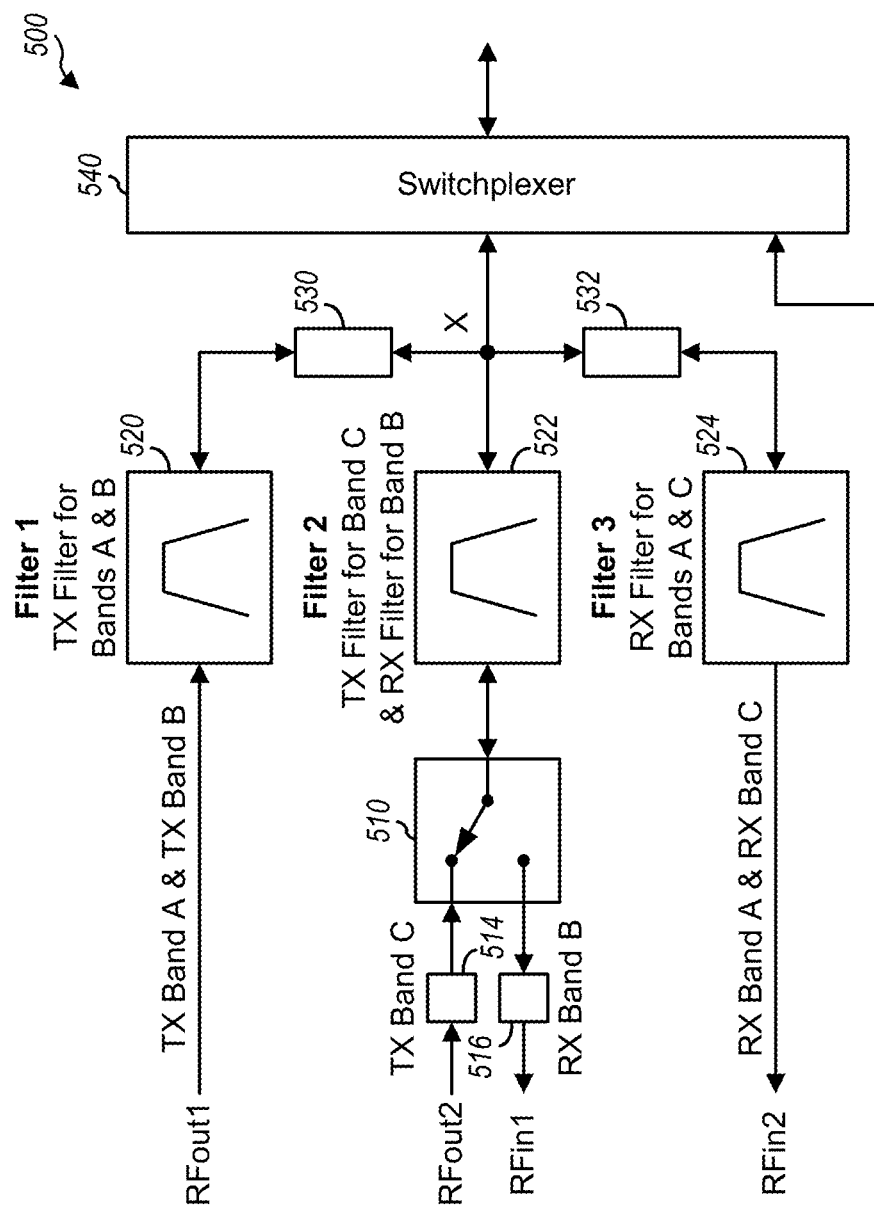
FIG. 5 shows an antenna interface circuit supporting three bands with shared filters.

FIG. 5 shows a block diagram of an exemplary design of an antenna interface circuit 500 supporting three bands with shared filters. The three bands are referred to as Band A, Band B, and Band C. Antenna interface circuit 500 includes a single-pole-double-throw (SPDT) switch 510, three filters 520, 522 and 524, matching circuits 514, 516, 530 and 532, and a switchplexer 540. In the exemplary design shown in FIG. 5, filter 520 serves as TX filters for Bands A and B, filter 522 serves as a TX filter for Band C and an RX filter for Band B, and filter 524 serves as RX filters for Bands A and C.

Filter 520 has its input receiving a first output RF signal (RFout1) for Band A or B and its output coupled to one terminal of matching circuit 530. The other terminal of matching circuit 530 is coupled to node X. Filter 522 has one terminal coupled to the single pole of switch 510 and the other terminal coupled to node X. Matching circuit 514 is coupled to the first throw of switch 510, and matching circuit 516 is coupled to the second throw of switch 510. A second output RF signal (RFout2) for Band C is provided to matching circuit 514, and a first input RF signal (RFin1) for Band B is provided by matching circuit 516. Filter 524 has its input coupled to one terminal of matching circuit 532 and its output providing a second input RF signal (RFin2) for Band A or C. The other terminal of matching circuit 532 is coupled to node X. Switchplexer 540 has an input coupled to node X. Other circuits may also be coupled to switchplexer 540.

In the exemplary design shown in FIG. 5, Bands A and B have the same or overlapping TX frequency ranges, and one filter 520 may be used as a TX filter for both Bands A and B. An RX frequency range for Band B overlaps a TX frequency range for Band C, and one filter 522 may be used as an RX filter for Band B and a TX filter for Band C. Bands A and C have the same or overlapping RX frequency ranges, and one filter 524 may be used as an RX filter for both Bands A and C.

Matching circuit 514 and/or 516 may be used to change the frequency response of an upper edge or a lower edge of filter 522. Matching circuits 530 and 532 may perform filter rejection between bands. In particular, matching circuit 530 may attenuate signals in Band C at the output of filter 520 and may also attenuate signals in Bands A and B at the output of filter 522. Matching circuit 532 may attenuate signals in Band C at the input of filter 524. Matching circuits 516, 530 and/or 532 may also perform power and/or impedance matching for filters 520, 522 and/or 524.

A filter (e.g., filter 522) may be used for TX and/or RX frequency ranges of multiple bands. The TX and/or RX frequency ranges of the multiple bands may overlap but may not be identical. The filter may be designed with a bandwidth covering the entire TX and/or RX frequency ranges. Alternatively, the filter may be designed with a bandwidth covering one TX or RX frequency range, and the frequency response of the filter may be changed with a matching circuit or some other techniques. For example, a filter may be used for a TX frequency range of 1920 to 1980 MHz in Band 1 and also for an RX frequency range of 1930 to 1990 MHz in Band 2. The filter may be designed with a bandwidth of 1920 to 1990 MHz covering the entire TX frequency range of Band 1 and the entire RX frequency range of Band 2. Alternatively, the filter may be designed with a bandwidth of 1930 to 1990, and a matching circuit may be used to change the lower edge of the filter to obtain a better frequency response for the TX frequency range of 1920 to 1980 MHz in Band 1. The filter may also be designed with a bandwidth of 1920 to 1980, and a matching circuit may be used to change the upper edge of the filter to obtain a better frequency response for the RX frequency range of 1930 to 1990 MHz in Band 2.

Figure 6:
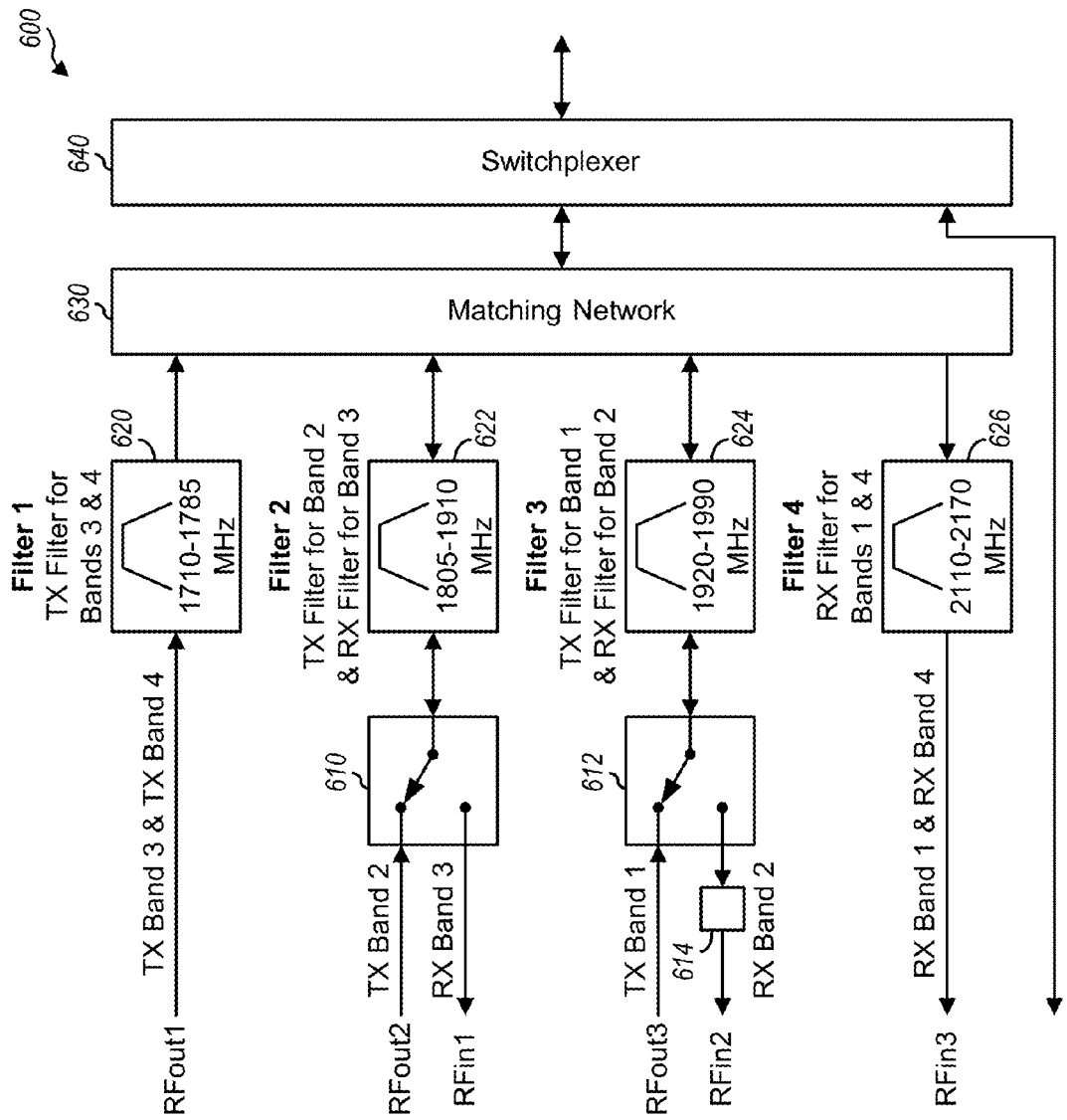
FIG. 6 shows an antenna interface circuit supporting four bands with shared filters.

FIG. 6 shows a block diagram of an exemplary design of an antenna interface circuit 600 supporting four bands with shared filters. The four bands correspond to Band 1, Band 2, Band 3, and Band 4 for UMTS/LTE. Table 1 lists the TX frequency ranges and RX frequency ranges for Bands 1 to 4.

TABLE 1

| LTE Band | TX Frequency Range | RX Frequency Range |
| --- | --- | --- |
| Band 1 | 1920 to 1980 MHz | 2110 to 2170 MHz |
| Band 2 | 1850 to 1910 MHz | 1930 to 1990 MHz |
| Band 3 | 1710 to 1785 MHz | 1805 to 1880 MHz |
| Band 4 | 1710 to 1755 MHz | 2110 to 2155 MHz |

In the exemplary design shown in FIG. 6, antenna interface circuit 600 includes SPDT switches 610 and 612, four filters 620, 622, 624 and 626, a matching circuit 614, a matching network 630, and a switchplexer 640. In the exemplary design shown in FIG. 6, filter 620 serves as TX filters for Bands 3 and 4, filter 622 serves as a TX filter for Band 2 and an RX filter for Band 3, filter 624 serves as a TX filter for Band 1 and an RX filter for Band 2, and filter 626 serves as RX filters for Bands 1 and 4.

Filter 620 has its input receiving a first output RF signal (RFout1) for Band 3 or 4 and its output coupled to a first terminal of matching network 630. Filter 622 has one terminal coupled to the single pole of switch 610 and its other terminal coupled to a second terminal of matching network 630. Switch 610 has its first throw receiving a second output RF signal (RFout2) for Band 2 and its second throw providing a first input RF signal (RFin1) for Band 3. Filter 624 has one terminal coupled to the single pole of switch 612 and its other terminal coupled to a third terminal of matching network 630. Switch 612 has its first throw receiving a third output RF signal (RFout3) for Band 1 and its second throw coupled to matching circuit 614. Matching circuit 614 provides a second input RF signal (RFin2) for Band 2. Filter 626 has its input coupled to a fourth terminal of matching network 630 and its output providing a third input RF signal (RFin3) for Band 1 or 4.

Switchplexer 640 is coupled to matching network 630. Other circuits (e.g., switches, a directional coupler, etc.) or an antenna may be coupled to switchplexer 640.

In the exemplary design shown in FIG. 6 and Table 1, Bands 3 and 4 have overlapping TX frequency ranges, and one filter 620 may be used as a TX filter for both Bands 3 and 4. The TX frequency range for Band 2 overlaps the RX frequency range for Band 3, and one filter 622 may be used as both a TX filter for Band 2 and an RX filter for Band 3. The TX frequency range for Band 1 overlaps the RX frequency range for Band 2, and one filter 624 may be used as both a TX filter for Band 1 and an RX filter for Band 2. Bands 1 and 4 have overlapping RX frequency ranges, and one filter 626 may be used as an RX filter for both Bands 1 and 4.

In an exemplary design, filter 620 may have a bandwidth of 1710 to 1785 MHz, which covers the TX frequency ranges of both Bands 3 and 4. Filter 622 may have a bandwidth of 1805 to 1910 MHz, which covers the TX frequency range for Band 2 and the RX frequency range for Band 3. Filter 624 may have a bandwidth of 1920 to 1990 MHz, which covers the TX frequency range of Band 1 and the RX frequency range of Band 2. Filter 626 may have a bandwidth of 2110 to 2170 MHz, which covers the RX frequency ranges of both Bands 1 and 4. Filters 620 to 626 may also have other bandwidths. In general, a shared filter for multiple bands may have a bandwidth equal to an aggregate bandwidth of all TX and/or RX frequency ranges covered by the shared filter. The aggregate bandwidth may cover the lowest frequency to the highest frequency of all TX and/or RX frequency ranges. A shared filter may also have a bandwidth that is wider or narrower than the aggregate bandwidth. For example, a shared filter may have a bandwidth equal to a TX frequency range or an RX frequency range of one band.

Matching circuit 614 may be used to change the frequency response of an upper edge or a lower edge of the passband of filter 624. Matching network 630 may perform filter rejection between bands.

FIGS. 5 and 6 show two exemplary designs of an antenna interface circuit supporting multiple bands with shared filters. In general, an antenna interface circuit may support any number of bands and may include any number of filters to cover all TX and RX frequency ranges of all supported bands. A filter may be shared by any number of bands and may cover TX frequency ranges, or RX frequency ranges, or TX and RX frequency ranges for multiple bands. A filter (e.g., filter 620 in FIG. 6) may be used as a TX filter covering the TX frequency ranges for multiple bands. A filter (e.g., filter 626 in FIG. 6) may also be used as an RX filter covering RX frequency ranges for multiple bands. A filter may also be used as both (i) a TX filter covering a TX frequency range for one band and (ii) an RX filter covering an RX frequency range for another band. If the TX frequency range is different from the RX frequency range, then a matching circuit (e.g., matching circuit 614) may be used to obtain a desired frequency response at the upper and/or lower edges of the non-matching TX and RX frequency ranges.

A switch may be coupled to a filter if it is used as a TX filter for one band and an RX filter for another band, e.g., as shown in FIGS. 5 and 6. The switch may (i) route an output RF signal to the filter when it is operating as a TX filter and (ii) route an input RF signal from the filter when it is operating as an RX filter.

Figure 7:
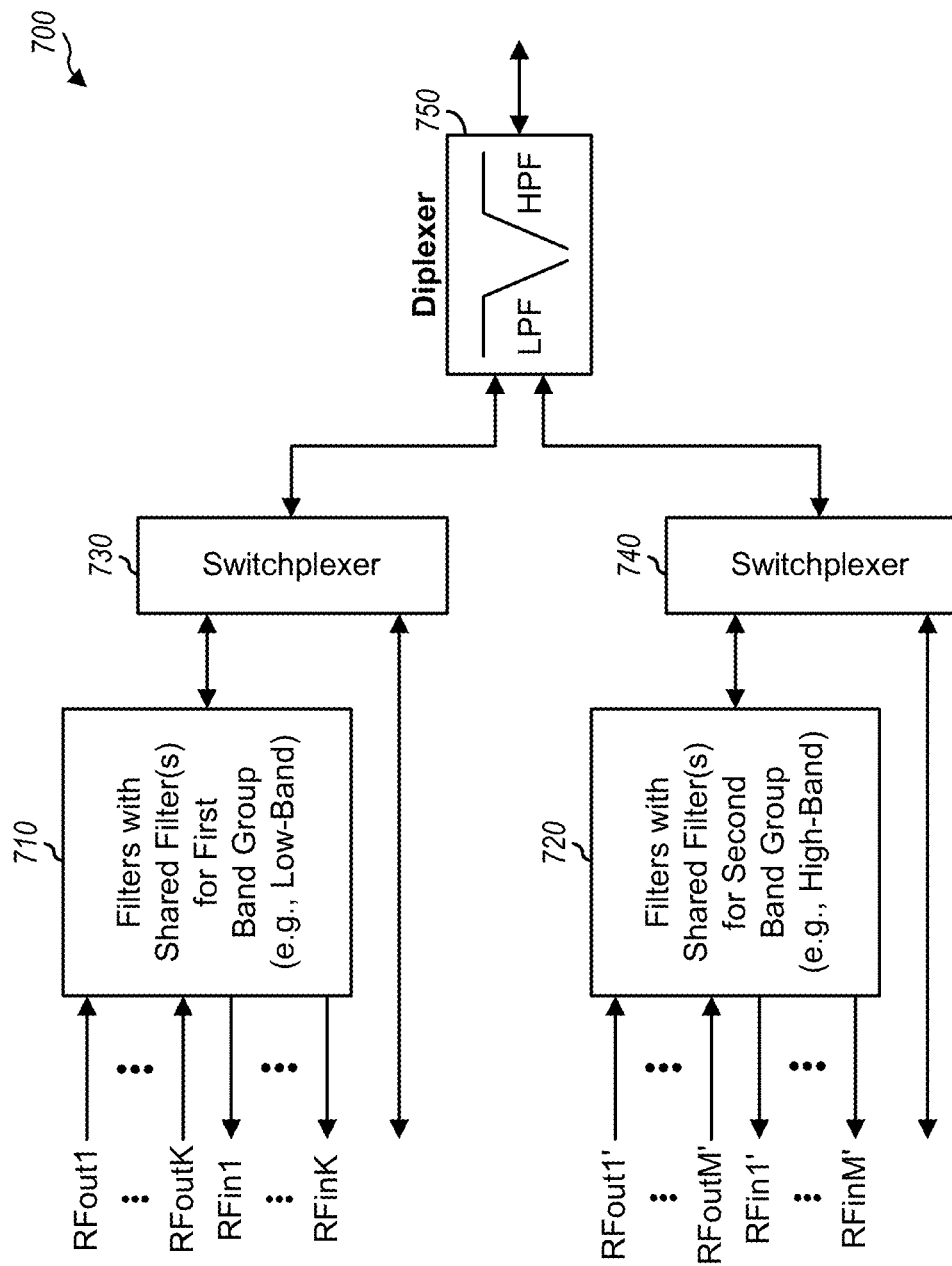
FIG. 7 shows an antenna interface circuit with shared filters for two band groups.

FIG. 7 shows an exemplary design of an antenna interface circuit 700 with shared filters for two band groups. In the exemplary design shown in FIG. 7, antenna interface circuit 700 includes a first set of filters 710 for a first band group, a second set of filters 720 for a second band group, switchplexers 730 and 740, and a diplexer 750. The first band group may be low-band, and the second band group may be high-band. The first and second band groups may also be a combination of low-band and mid-band or a combination of mid-band and high-band. Filters 710 may receive K output RF signals (RFout1 to RFoutK) from one or more transmitters for the first band group and may provide K input RF signals (RFin1 to RFinK) to one or more receivers for the first band group, where K may be any integer value of one or greater. Filters 720 may receive M output RF signals (RFout1' to RFoutM') from one or more transmitters for the second band group and may provide M input RF signals (RFin1' to RFinM') to one or more receivers for the second band group, where M may be any integer value of one or greater. Filters 710 may include at least one shared filter for the first band group, and filters 720 may include at least one shared filter for the second band group. Each shared filter may cover TX frequency ranges, or RX frequency ranges, or TX and RX frequency ranges for multiple bands in one band group. Filters 710 and/or 720 may be implemented as shown in FIG. 5 or 6 or may include filters for other combinations of bands.

The first set of filters 710 is coupled to one or more inputs of switchplexer 730. Other inputs of switchplexer 730 may be coupled to circuits for other bands, radio technologies, etc. The second set of filters 720 is coupled to one or more inputs of switchplexer 740. Other inputs of switchplexer 740 may be coupled to circuits for other bands, radio technologies, etc. Other outputs of switchplexers 730 and 740 are coupled to diplexer 750. Diplexer 750 includes a lowpass filter (LPF) for the first band group and a highpass filter (HPF) for the second band group. Filters 710 are coupled to the lowpass filter in diplexer 750, and filters 720 are coupled to the high-pass filter in diplexer 750. Diplexer 750 may further couple to an antenna or other circuits (e.g., a directional coupler or a matching circuit).

FIG. 7 shows an exemplary design of antenna interface circuit 700 including filters, switchplexers, and a diplexer. An antenna interface circuit may also include different and/or additional circuits not shown in FIG. 7. For example, an antenna interface circuit may include a directional coupler, matching circuits, etc.

The shared filters disclosed herein may provide various advantages. First, the shared filters may reduce the total number of filters needed to support a plurality of bands. A wireless device may support a relatively large number of bands. Sharing filters for transmit paths and/or receive paths for multiple bands may reduce the total number of filters needed to support all bands supported by the wireless device. Second, the shared filters may reduce the total number of input/output (I/O) pins on an RFIC to support the plurality of bands. For example, a single I/O pin may be shared for a transmit path for one band and a receive path for another band. Third, the shared filters may reduce the number of signal traces to an antenna, which may mitigate issues related to signal coupling and interference. Fourth, the shared filters may reduce the size and cost of an antenna interface circuit and hence a wireless device.

The shared filters disclosed herein may be advantageous for carrier aggregation, especially for intra-band and inter-band CA. There may be a large number of band combinations and scenarios for carrier aggregation. For example, a wireless device may be designed to support Bands 1, 2/25, 3, 4, 5/6/18/19/26, 7, 8, 12, 13, 17, 20, 34, 38, 39, 40 and 41 in UMTS/LTE, where x/y/z denotes x, or y, or z, or a combination thereof. The shared filters may enable an antenna interface circuit of a smaller size and lower insertion loss to support all band combinations. The shared filters may also enable a wireless device to support more bands, which may allow the wireless device to be used in more frequency regions and to be sold in more end user markets.

In an exemplary design, an apparatus (e.g., a wireless device, an IC, a circuit module, etc.) may comprise a filter and a switch. The filter (e.g., filter 522 in FIG. 5 or filter 622 in FIG. 6) may operate as a TX filter for a first band (e.g., Band C in FIG. 5 or Band 1 or 2 in FIG. 6) and as an RX filter for a second band (e.g., Band B in FIG. 5 or Band 2 or 3 in FIG. 6). The filter may (i) receive and filter an output RF signal when operating as the TX filter and (ii) receive and filter a received RF signal when operating as the RX filter. The switch (e.g., switch 510 in FIG. 5 or switch 610 in FIG. 6) may be coupled to the filter. The switch may (i) receive and pass the output RF signal to the filter when the filter operates as the TX filter and (ii) receive and pass an input RF signal from the filter when the filter operates as the RX filter. The switch may include a pole coupled to the filter, a first throw receiving the output RF signal, and a second throw providing the input RF signal.

The filter may have a bandwidth covering a TX frequency range of the first band and an RX frequency range of the second band. The filter may also have a bandwidth that is smaller or larger than an aggregate bandwidth covering the TX frequency range of the first band and the RX frequency range of the second band.

The apparatus may further comprise one or more additional shared filters, with each shared filter being used for multiple bands. In an exemplary design, the apparatus may further comprise a second filter (e.g., filter 520 in FIG. 5 or filter 620 in FIG. 6) operable as a TX filter for multiple bands. The multiple bands may include the second band and a third band (e.g., Bands A and B in FIG. 5 or Bands 3 and 4 in FIG. 6) or some other combination of bands. In an exemplary design, the apparatus may further comprise a third filter (e.g., filter 524 in FIG. 5 or filter 626 in FIG. 6) operable as an RX filter for multiple bands. The multiple bands may include the first band and a third band (e.g., Bands A and C in FIG. 5 or Bands 1 and 4 in FIG. 6). In an exemplary design, the apparatus may further comprise a fourth filter (e.g., filter 624 in FIG. 6) operable as a TX filter for a third band and as an RX filter for the first band or a fourth band.

In an exemplary design, the apparatus may further comprise a matching circuit/hardware (e.g., matching circuit 530 or 532 in FIG. 5 or matching network 630 in FIG. 6) coupled to the filter. This matching circuit/network may provide rejection of at least one other band. The apparatus may further comprise a matching circuit (e.g., matching circuit 516 in FIG. 5 or matching circuit 614 in FIG. 6) coupled to the switch. This matching circuit may vary the frequency response of the filter at a lower edge or an upper edge of a passband of the filter.

In an exemplary design, the apparatus may further comprise a diplexer (e.g., diplexer 750 in FIG. 7) coupled to the filter. The diplexer may include a lowpass filter and a highpass filter and may be used to support multiple band groups (e.g., low-band and high-band).

Figure 8:
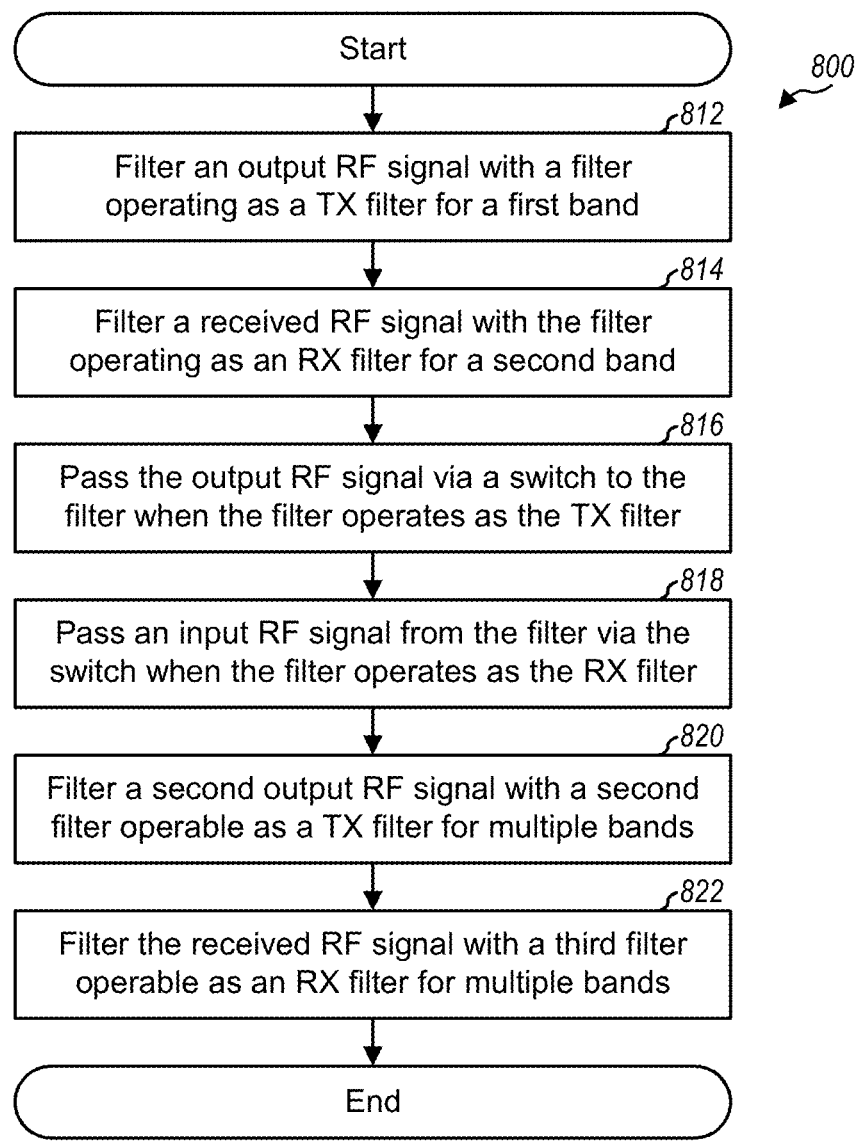
FIG. 8 shows a process for performing filtering.

FIG. 8 shows an exemplary design of a process 800 for performing filtering. An output RF signal may be filtered with a filter (e.g., filter 522 in FIG. 5 or filter 622 in FIG. 6) operating as a TX filter for a first band (block 812). A received RF signal may be filtered with the filter operating as an RX filter for a second band (block 814). The output RF signal may be passed via a switch (e.g., switch 510 in FIG. 5 or switch 610 in FIG. 6) to the filter when the filter operates as the TX filter (block 816). An input RF signal from the filter may be passed via the switch when the filter operates as the RX filter (block 818). A second output RF signal may be filtered with a second filter (e.g., filter 520 in FIG. 5 or filter 620 in FIG. 6) operable as a TX filter for multiple bands (block 820). The received RF signal may be filtered with a third filter (e.g., filter 524 in FIG. 5 or filter 626 in FIG. 6) operable as an RX filter for multiple bands (block 822).

The shared filters described herein may be implemented on an IC, an analog IC, an RFIC, a mixed-signal IC, an ASIC, a printed circuit board (PCB), an electronic device, etc. The shared filters may also be fabricated with various IC process technologies such as complementary metal oxide semiconductor (CMOS), N-channel MOS (NMOS), P-channel MOS (PMOS), bipolar junction transistor (BJT), bipolar-CMOS (BiCMOS), silicon germanium (SiGe), gallium arsenide (GaAs), heterojunction bipolar transistors (HBTs), high electron mobility transistors (HEMTs), silicon-on-insulator (SOI), etc.

An apparatus implementing the shared filters described herein may be a stand-alone device or may be part of a larger device. A device may be (i) a stand-alone IC, (ii) a set of one or more ICs that may include memory ICs for storing data and/or instructions, (iii) an RFIC such as an RF receiver (RFR) or an RF transmitter/receiver (RTR), (iv) an ASIC such as a mobile station modem (MSM), (v) a module that may be embedded within other devices, (vi) a receiver, cellular phone, wireless device, handset, or mobile unit, (vii) etc.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the scope of the disclosure. Thus, the disclosure is not intended to be limited to the examples and designs described herein but is to be accorded the widest scope consistent with the principles and novel features disclosed herein.

What is claimed is:

1. An apparatus comprising:
   a first filter having a first bandpass frequency range and operable as a first transmit (TX) filter for a first band and as a first receive (RX) filter for a second band, the first filter configured to receive an output radio frequency (RF) signal and to filter the output RF signal according to the first bandpass frequency range while operating as the first TX filter and to receive a received RF signal and to filter the received RF signal according to the first bandpass frequency range while operating as the first RX filter;
   a switch coupled to the first filter and configured to receive and pass the output RF signal to the first filter while the first filter operates as the first TX filter and to receive and pass the received RF signal from the first filter while the first filter operates as the first RX filter;
   a second filter having a second bandpass frequency range and operable as a second TX filter for the second band and as a third TX filter for a third band, the second filter configured to receive a second output RF signal and to filter the second output RF signal according to the second bandpass frequency range while operating as the second TX filter and to receive a third output RF signal and to filter the third output RF signal according to the second bandpass frequency range while operating as the third TX filter; and
   a switchplexer coupled to the first filter and to the second filter.

2. The apparatus of claim 1, wherein the first band includes a first TX frequency range and a first RX frequency range, wherein the second band includes a second TX frequency range and also includes a second RX frequency range that at least partially overlaps the first TX frequency range, wherein the filter is configured to filter the output RF signal when operating as the TX filter for the first TX frequency range and to filter the received RF signal when operating as the RX filter for the second RX frequency range.

3. The apparatus of claim 2, wherein the first bandpass frequency range of the first filter excludes at least a portion of an aggregate frequency range of the first TX frequency range and the second RX frequency range, wherein a TX path of an RF device that includes the filter and the switch includes a first terminal of the switch, and wherein a RX path of the RF device includes a second terminal of the switch, the apparatus further comprising:
   a matching circuit coupled to one of the first terminal or the second terminal, the matching circuit configured to vary a frequency response of the filter at a lower edge or at an upper edge of the first bandpass frequency range of the filter to include the portion of the aggregate frequency range.

4. The apparatus of claim 2, wherein the first bandpass frequency range covers the first TX frequency range of the first band and the second RX frequency range of the second band.

5. The apparatus of claim 2, wherein the first bandpass frequency range comprises a bandwidth of the filter, the bandwidth covering a first frequency range, and wherein the bandwidth is smaller than an aggregate bandwidth covering the first TX frequency range of the first band and the second RX frequency range of the second band.

6. The apparatus of claim 1, further comprising a third filter coupled to the switchplexer, the third filter having a third bandpass frequency range and operable as a second RX filter for the first band and as a third RX filter for the third band, the third filter configured to receive a second received RF signal and to filter the second received RF signal according to third bandpass frequency range while operating as the second RX filter and to receive a third received RF signal and to filter the third received RF signal according to the third bandpass frequency range while operating as the third RX filter.

7. The apparatus of claim 6, further comprising an antenna coupled to the switchplexer.

8. The apparatus of claim 7, wherein the switchplexer is configured to selectively couple the first filter to the antenna, to selectively couple the second filter to the antenna, and to selectively couple the third filter to the antenna.

9. The apparatus of claim 8, further comprising:
   a third filter having a third bandpass frequency range and operable as a fourth TX filter for a fourth band and as a second RX filter for a fifth band, the third filter configured to receive a fourth output RF signal and to filter the fourth output RF signal according to the third bandpass frequency range while operating as the third TX filter and to receive a second received RF signal and to filter the second received RF signal according to the third bandpass frequency range while operating as the second RX filter;
   a second switch coupled to the third filter and configured to receive and pass the fourth output RF signal to the third filter while the third filter operates as the fourth TX filter and to receive and pass the second received RF signal from the third filter while the third filter operates as the second RX filter;
   a fourth filter having a fourth bandpass frequency range and operable as a fifth TX filter for the fifth band and as a third TX filter for a sixth band, the fourth filter configured to receive a fifth output RF signal and to filter the fifth output RF signal according to the fourth bandpass frequency range while the fourth filter is operating as the fifth TX filter and to receive a sixth output RF signal and to filter the sixth output RF signal according to the fourth bandpass frequency range while the fourth filter is operating as the sixth TX filter;

a second switchplexer coupled to the third filter and the fourth filter; and a diplexer coupled to the switchplexer and to the second switchplexer, the diplexer configured to receive and pass the output RF signal from the first filter to the antenna via the switchplexer while the first filter operates as the first TX filter.

10. The apparatus of claim 1, further comprising a third filter operable as a TX filter for a fourth band and as an RX filter for the first band.

11. The apparatus of claim 1, further comprising:
a matching circuit coupled to the filter and configured to provide rejection of at least one other band.

12. The apparatus of claim 1, further comprising:
an antenna; and
a diplexer coupled to the first filter and coupled to the antenna, the diplexer comprising a lowpass filter and a highpass filter, the diplexer configured to receive and pass the output RF signal from the first filter to the antenna via the switchplexer when the first filter operates as the first TX filter.

13. The apparatus of claim 1, further comprising an input/output (I/O) pin of an RF device that includes the first filter and the switch, the I/O pin shared by a TX path of the RF device for the first band and a RX path of the RF device for the second band.

14. The apparatus of claim 6, the switchplexer configured to:
receive and pass the received RF signal to the first filter while the first filter operates as the first RX filter, and
receive and pass the output RF signal from the first filter while the first filter operates as the first TX filter.

15. The apparatus of claim 14, wherein the switchplexer is further configured to:
receive and pass the second RF output signal from the second filter while the second filter operates as the second TX filter, and
receive and pass the third RF output signal from the second filter while the second filter operates as the third TX filter.

16. The apparatus of claim 15, wherein the switchplexer is further configured to:
receive and pass the second received RF signal to the third filter while the third filter operates as the second RX filter, and
receive and pass the third received RF signal to the third filter while the third filter operates as the third RX filter.

17. A method comprising:
filtering, at a radio frequency (RF) device, an output RF signal with a first filter operating as a first transmit (TX) filter for a first band, the output RF signal filtered according to a first bandpass frequency range of the filter;
filtering, at the RF device, a received RF signal with the first filter operating as a first receive (RX) filter for a second band, the received RF signal filtered according to the first bandpass frequency range;
passing the output RF signal via a switch to the first filter while the first filter is operating as the first TX filter; and
passing the received RF signal from the first filter via the switch while the first filter is operating as the first RX filter;
filtering, at the RF device, a second output RF signal with a second filter operating as a second TX filter for the second band, the second output RF signal filtered according to a second bandpass frequency range of the second filter; and
filtering, at the RF device, a third output RF signal with the second filter operating as a third TX filter for a third band, the third output RF signal filtered according to the second bandpass frequency range of the second filter.

18. The method of claim 17, further comprising:
filtering, at the RF device, a second received RF signal while a third filter is operating as a second RX filter for the first band, the second received RF signal filtered according to a third bandpass frequency range of the third filter; and
filtering, at the RF device, a third received RF signal while the third filter is operating as a third RX filter for the third band, the third received RF signal filtered according to the third bandpass frequency range of the third filter.

19. An apparatus comprising:
means for first filtering configured to receive an output radio frequency (RF) signal and to filter the output RF signal according to a first bandpass frequency range of the means for first filtering while the means for first filtering operates as a first transmit (TX) filter for a first band and to receive a received RF signal and to filter the received RF signal according to the first bandpass frequency range while the means for first filtering operates as a first receive (RX) filter for a second band;
means for first switching coupled to the means for first filtering and configured to receive and pass the output RF signal to the means for first filtering while the means for first filtering operates as the first TX filter and to receive and pass the received RF signal from the means for first filtering while the means for first filtering operates as the first RX filter;
means for second filtering configured to receive a second output RF signal and to filter the second output RF signal according to a second bandpass frequency range of the means for second filtering while the means for second filtering operates as a second TX filter for the second band and to receive a third output RF signal and to filter the third output RF signal according to the second bandpass frequency range while the means for second filtering operates as a third TX filter for a third band; and
means for second switching coupled to the means for first filtering and to the means for second filtering.

20. The apparatus of claim 19, further comprising means for third filtering configured to receive a second received RF signal and to filter the second received RF signal according to a third bandpass frequency range of the means for third filtering while the means for third filtering operates as a second RX filter for the first band and to receive a third received RF signal and to filter the third received RF signal according to the third bandpass frequency range while the means for third filtering operates as a third RX filter for the third band, wherein the means for second switching is coupled to the means for third filtering.

* * * * *